(12) United States Patent
Tolksdorf

(10) Patent No.: US 9,109,680 B2
(45) Date of Patent: Aug. 18, 2015

(54) POWER SPLIT GEARBOX

(75) Inventor: Detlef Tolksdorf, Essen (DE)

(73) Assignee: Hytrac GmbH, Essen (DE)

( * ) Notice: Subject to any disclaimer, the term of this patent is extended or adjusted under 35 U.S.C. 154(b) by 27 days.

(21) Appl. No.: 13/995,333

(22) PCT Filed: Dec. 20, 2011

(86) PCT No.: PCT/DE2011/002148
§ 371 (c)(1),
(2), (4) Date: Sep. 13, 2013

(87) PCT Pub. No.: WO2012/089192
PCT Pub. Date: Jul. 5, 2012

(65) Prior Publication Data
US 2014/0018201 A1    Jan. 16, 2014

(30) Foreign Application Priority Data

Dec. 30, 2010   (DE) .......................... 10 2010 056 474
May 21, 2011   (DE) .......................... 10 2011 102 210

(51) Int. Cl.
| | | |
|---|---|---|
| F16H 47/04 | (2006.01) | |
| F16H 39/04 | (2006.01) | |
| F16H 3/44 | (2006.01) | |
| F16H 37/04 | (2006.01) | |
| F16H 39/02 | (2006.01) | |
| F16H 37/08 | (2006.01) | |

(52) U.S. Cl.
CPC ................ *F16H 39/04* (2013.01); *F16H 3/44* (2013.01); *F16H 47/04* (2013.01); *F16H 37/042* (2013.01); *F16H 39/02* (2013.01); *F16H 2037/088* (2013.01); *F16H 2037/0886* (2013.01)

(58) Field of Classification Search
CPC ........... F16H 47/04; F16H 39/02; F16H 3/44; F16H 37/042
USPC ................... 475/72, 80, 81, 82, 83, 302, 317; 74/730.1, 665 A, 665 D, 665 E
See application file for complete search history.

(56) References Cited

U.S. PATENT DOCUMENTS

| | | | | |
|---|---|---|---|---|
| 3,538,790 A * | 11/1970 | Polak | ............................... | 475/24 |
| 3,709,061 A * | 1/1973 | Orshansky, Jr. | .................. | 475/80 |
| 3,714,845 A * | 2/1973 | Mooney, Jr. | ..................... | 475/81 |
| 3,918,325 A * | 11/1975 | Frost | ............................... | 475/82 |
| 4,959,962 A * | 10/1990 | Hagin et al. | ..................... | 60/626 |
| 5,890,981 A * | 4/1999 | Coutant et al. | ................... | 475/72 |
| 5,931,758 A * | 8/1999 | Walter | ............................ | 475/72 |
| 6,424,902 B1 * | 7/2002 | Kuras | .............................. | 701/51 |
| 6,565,471 B2 * | 5/2003 | Weeramantry et al. | ......... | 475/80 |

(Continued)

*Primary Examiner* — Roger Pang
(74) *Attorney, Agent, or Firm* — Jordan and Hamburg LLP

(57) ABSTRACT

A hydrostatic mechanical power split transmission includes a housing, at least one first power branch having at least one hydraulic pump and at least one hydraulic motor, and at least one drive shaft provided with gear wheel elements, which is disposed inside the housing and can be directly or indirectly driven by at least one drive engine, in particular an internal combustion engine as a further power branch, the drive shaft being able to selectively act either directly or indirectly on the sun gear of a planetary gear system by way of at least one clutch, to be decoupled from the planetary gear system, wherein the planetary gear system can be switched to a state of constrained motion by way of further clutches as a function of the respective operating state of the power split transmission.

19 Claims, 4 Drawing Sheets

(56) References Cited

U.S. PATENT DOCUMENTS

Figure 1:
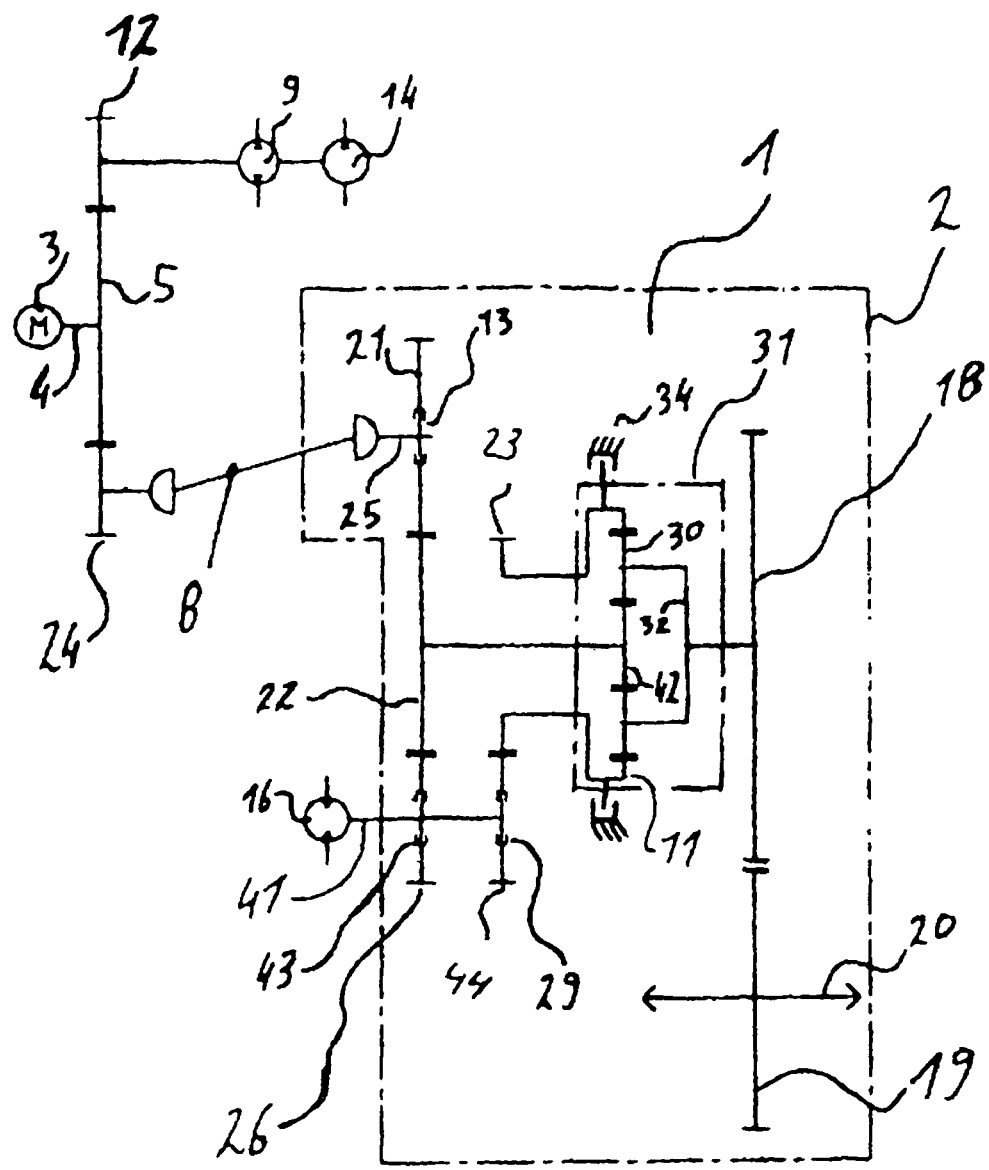

| | | | |
|---|---|---|---|
| 2004/0058770 A1* | 3/2004 | Ishii | 475/72 |
| 2005/0059521 A1* | 3/2005 | Funato et al. | 475/73 |
| 2010/0062889 A1* | 3/2010 | Lindsay et al. | 475/73 |
| 2010/0275725 A1* | 11/2010 | Tolksdorf et al. | 74/732.1 |

* cited by examiner

POWER SPLIT GEARBOX

BACKGROUND OF THE INVENTION

The invention relates to a hydrostatic mechanical power split transmission.

A hydrostatic mechanical power split transmission is described in DE 10 2004 001 929 A1, for example. The invention proposes a power split transmission having a continuously variable transmission ratio, which comprises a hydrostatic transmission part, composed of a first hydrostatic unit having a variable volume and a second hydrostatic unit having a constant volume, and a mechanical transmission part having a summation gearbox and a range change gearbox, in which the summation gearbox and the range change gearbox are disposed axially offset relative to the hydrostatic units.

A further hydrostatic mechanical power split transmission is described in WO 2009/071060 A2, comprising a housing, or a housing composed of individual housing parts, and at least one drive shaft, which is disposed inside the housing and can be driven by at least one drive engine, particularly an internal combustion engine, and which acts on at least two hydraulic pumps by way of gear elements in the manner of a pump transfer case and is provided with at least one further gear wheel, which directly or indirectly acts on an output element of a power-shift transmission, wherein at least in the region of the gear wheel at least one clutch element is positioned, and wherein the power-shift transmission has at least one shaft that can be driven in the hydrostatic circuit, wherein clutches, brakes, components of a single-step planetary gear system and similar components are provided in the region of said shaft, and wherein the output element of the power-shift transmission is connected to at least one output shaft.

SUMMARY OF THE INVENTION

The object of the invention is to provide an alternative hydrostatic mechanical power split transmission, which is suitable for operating internal combustion engines in a rotational speed-optimized manner while achieving improved efficiency by activating, in different operating states, by way of respective clutches, those drive elements which constitute an optimal efficiency balance, and by deactivating, by way of clutches, and bringing to a halt, those drive elements which are not functionally employed in certain operating ranges, but may adversely affect the overall efficiency, for example due to the drag loss of hydraulic motors.

This object is achieved by a hydrostatic mechanical power split transmission, comprising a housing, at least one first power branch composed of at least one hydraulic pump and at least one hydraulic motor, and at least one drive shaft provided with gear wheel elements, which is disposed inside the housing and can be directly or indirectly driven by at least one drive engine, in particular an internal combustion engine as a further power branch, the drive shaft being able to selectively act either directly or indirectly on the sun gear of a planetary gear system by way of at least one clutch, or to be decoupled from the planetary gear system, wherein the planetary gear system can be switched to a state of constrained motion by way of further clutches as a function of the respective operating state of the power split transmission.

The transmission according to the invention can be driven directly or indirectly by at least one drive engine, in particular an internal combustion engine, by way of a drive shaft, which is provided with at least one clutch and can directly or indirectly be selectively connected to the sun gear of the planetary gear system or selectively be switched to have no friction fit, wherein the planetary gear system can be selectively switched to a state of constrained motion by way of at least two clutches. A person skilled in the art considers a state of constrained motion to be a state in which the movement of one of the three shafts of the planetary gear system defines the movement of the two remaining shafts of the planetary gear system. In kinematics, this is also described with the degree of freedom F=1 according to Gruebler's equation.

The clutches/brakes provided in the area of the power split transmission can be actuated so that the transmission can be selectively operated:

only hydraulically, with the mechanical drive shaft deactivated;

in a torque-split manner, which is to say driven hydraulically and using a mechanically activated drive shaft; or only mechanically, with a selectively activated state of constrained motion of the planetary gear system, and/or with selective deactivation of the hydrostatic power branch.

According to another aspect of the invention, a shaft, which is advantageously a universal shaft, can be driven directly by the drive engine.

Moreover, the individual hydraulic motor may be selectively coupled to the sun gear and/or the ring gear.

The hydraulic motor may additionally be decoupled from the planetary gear system by appropriate clutches.

It is further proposed that, in the decoupled state, the hydraulic motor is brought to a halt by the hydraulic pump being regulated to a pump flow rate Q=0 l/min.

It is particularly advantageous if the hydraulic motor and/or the hydraulic pump are disposed inside the housing. In this manner, an extremely space-saving design is achieved for the power split transmission according to the invention.

However, the subject matter of the invention does not exclude positioning the hydraulic motor and/or the hydraulic pump outside the housing, provided that the installation conditions within the vehicle, for example a wheel loader, allow this.

If the hydraulic motor and/or the hydraulic pump are disposed inside the housing, according to a further aspect of the invention, designing the hydraulic motor and/or the hydraulic pump without separate housing bodies is proposed. The moving drive elements of the hydraulic motor and/or of the hydraulic pump may, in that event, be positioned outside a housing in which the oil sump is housed, so as to prevent churning losses. The overflow oil line connections that are necessarily provided in a housing for a hydraulic motor and/or a hydraulic pump for cooling the moving drive elements may then be dispensed with, because oil from the housing oil sump may be used, which is sprayed onto the moving drive elements of the housing-less hydraulic motor and/or hydraulic pump. Because churning losses are prevented, a significant increase in the overall efficiency of the power split transmission can be achieved.

According to a further aspect of the invention, the further (mechanical) power branch can be connected to the sun gear via an associated clutch in a power-adaptive and/or rotational speed-adaptive and/or acceleration-adaptive manner.

It is additionally proposed that the further (mechanical) power branch can be connected to the sun gear in such a way that the operation of the internal combustion engine is optimized in terms of fuel consumption.

It is likewise conceivable for the hydraulic motor to be connected to the sun gear by way of a clutch in a power-adaptive and/or rotational speed-adaptive and/or acceleration-adaptive manner.

Moreover, in certain operating ranges of the vehicle, it may be useful to connect the hydraulic motor to the ring gear by way of a clutch in a power-adaptive and/or rotational speed-adaptive and/or acceleration-adaptive manner.

Because vehicles equipped with the power split transmission according to the invention, such as wheel loaders, dumpers/tractors or the like, do not always drive only forward, it is proposed to provide a reversing stage gear train in the area of the drive shaft, the reversing stage gear train reversing the direction of rotation of the sun gear by way of a clutch.

According to a further aspect of the invention, the hydraulic motor is constituted by a variable displacement motor and the hydraulic pump is constituted by a variable displacement pump.

It may also be advantageous if the hydraulic pump is directly or indirectly driven by the drive engine.

It is further proposed that the ring gear of the planetary gear system can be fixed by way of a brake, wherein the planet carrier of the planetary gear system is directly or indirectly connected to the output shaft.

The subject matter of the invention is shown in the drawings based on an exemplary embodiment and is described as follows.

BRIEF DESCRIPTION OF THE INVENTION

Figure 2:
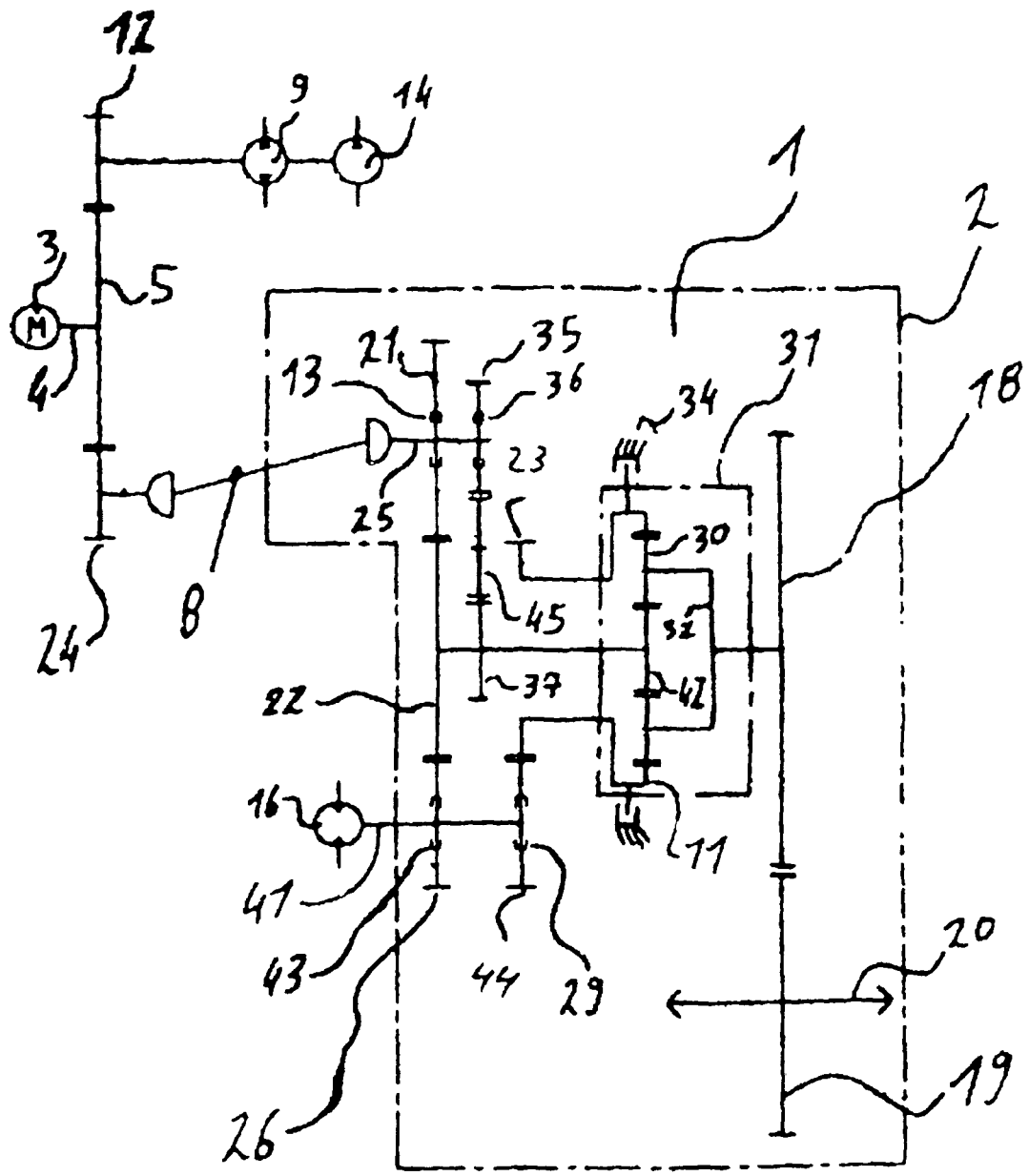

In the drawings:

FIGS. 1 and 2 are schematic diagrams of the hydrostatic mechanical power split transmission according to embodiments of the invention having differing drive element designs.

Figure 3:
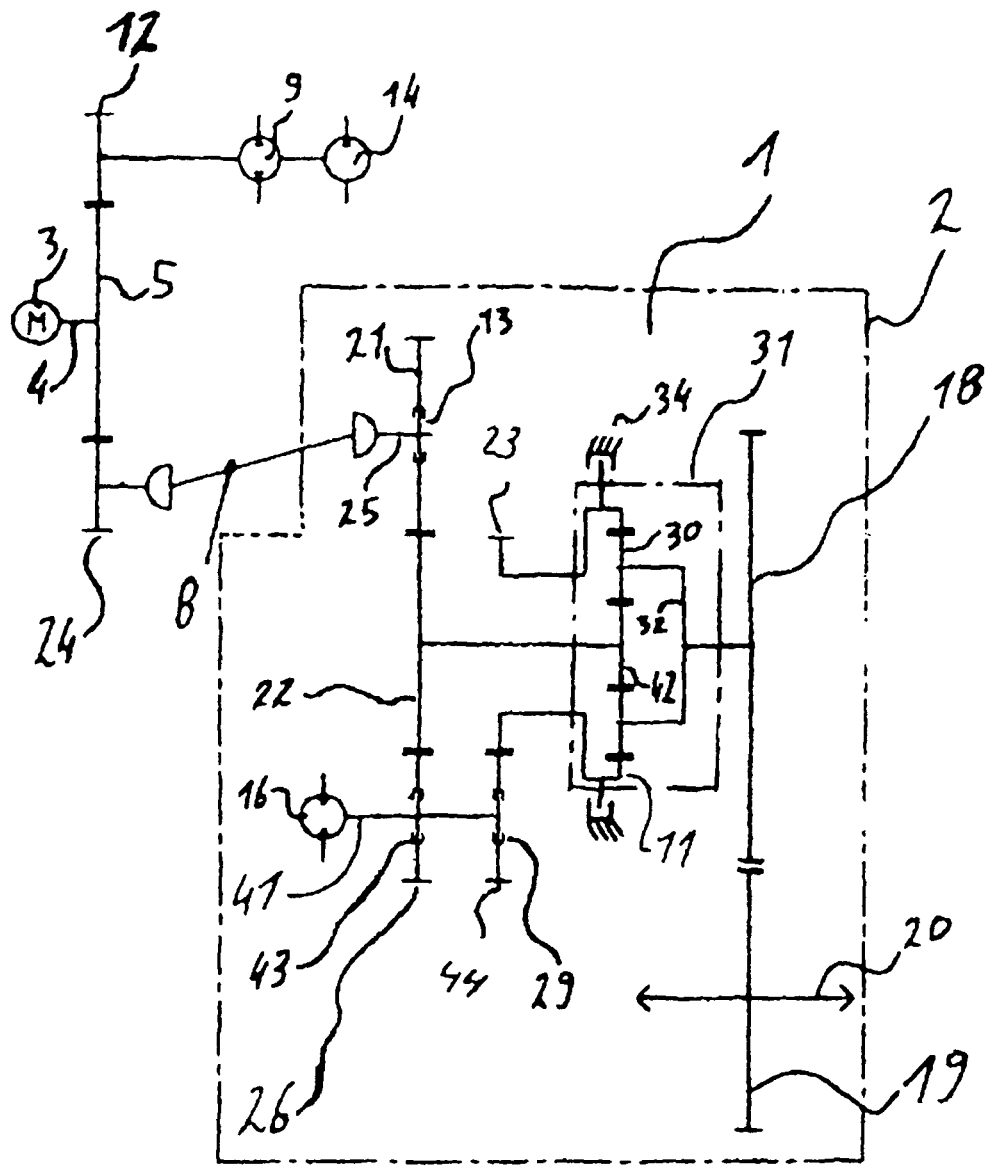
Figure 4:
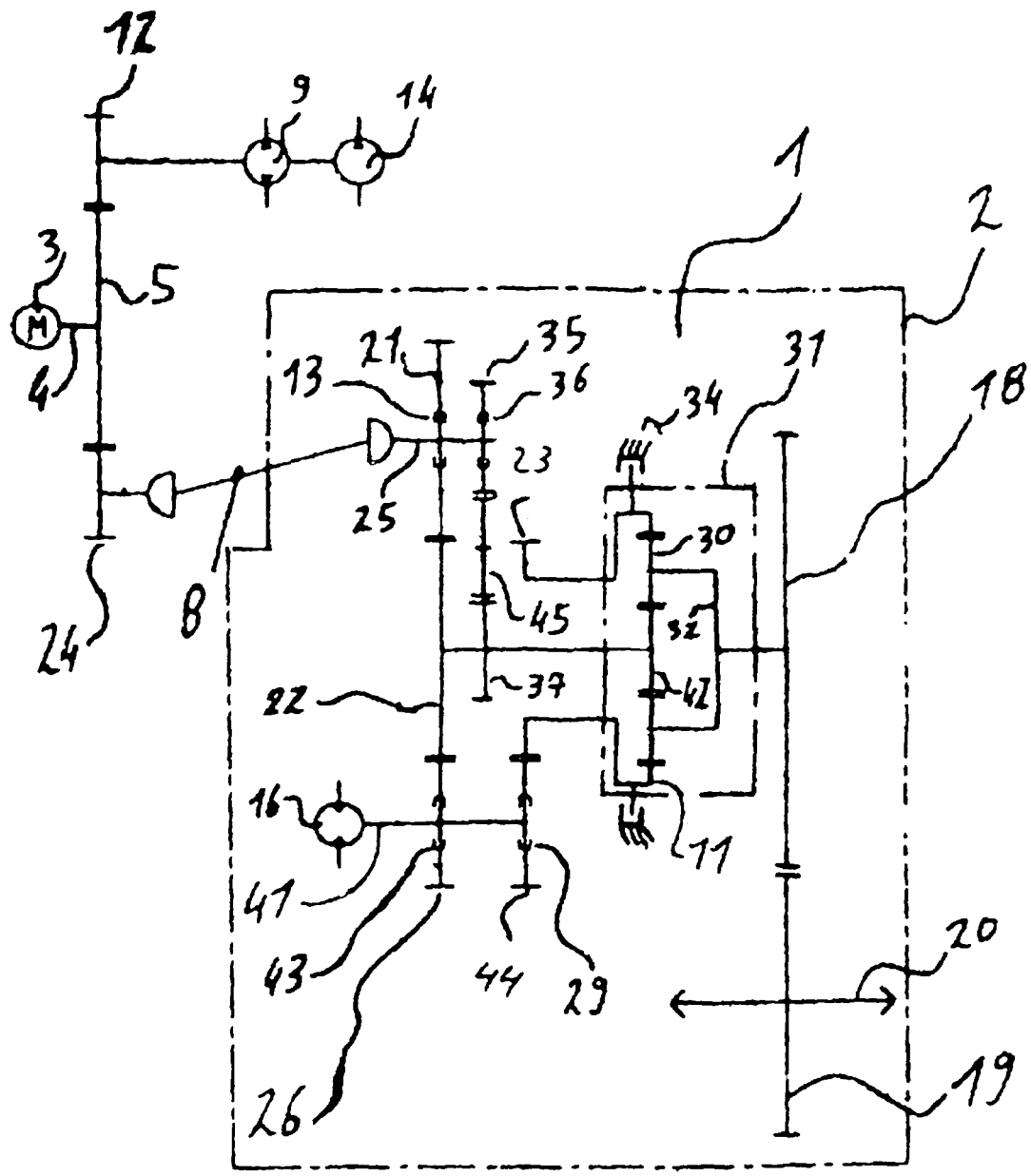

FIGS. 3 and 4 are schematic diagrams of the hydrostatic mechanical power split transmission according to corresponding embodiments of the invention of FIGS. 1 and 2 in which a hydraulic motor 16 is situated within the housing 2.

DETAILED DESCRIPTION OF THE INVENTION

FIGS. 1 and 2 show schematic diagrams of the power split transmission 1 according to embodiments of the invention, having differing drive element designs. FIGS. 3 and 4 show schematic diagrams of the power split transmission 1 according to additional embodiments, in which a hydraulic motor 16 is situated within the housing 2.

The power split transmission 1 according to each one of FIGS. 1 and 3 comprise comprises a housing 2 and is mechanically driven by way of a shaft 8 which is a universal shaft in this example. A drive engine 3, which is an internal combustion engine, drives a drive shaft 4, to which a gear wheel element 5 is directly attached and meshes with a further gear wheel element 24, which in turn drives the shaft 8. The gear wheel element 5 is additionally operatively connected to a gear wheel 12, the gear wheel elements 5, 12 cooperating with the hydraulic pumps 9 and 14, and the hydraulic pump 9, which is a variable displacement pump, drives the hydraulic motor 16, which is a variable displacement motor and mounted to the power split transmission 1 or the housing 2 thereof.

So as to reduce the installation space, the hydraulic motor 16 may also be disposed inside the housing 2 and used, in this form, as a housing-free hydraulic motor 16.

A planetary gear system 31, which essentially comprises a ring gear 11, a planet gear 30, a sun gear 42 and a planet carrier 32, is located inside the power split transmission 1 or the housing 2 thereof. The power split transmission 1, or the housing 2 thereof, further comprises the drive shaft 41 for hydrostatic operation by way of the hydraulic motor 16.

During a first driving range phase, customarily having low speeds and a greater need for traction forces and/or torque, the hydraulic motor 16 drives the sun gear 42, wherein a brake 34 is switched so as to be friction fit, so as to clamp the ring gear 11 against the housing 2, while a further clutch 29 is disengaged and another clutch 43 is engaged. In this operating state, the hydraulic motor 16 drives the sun gear 42 by way of the gear wheels 26, 22, so that the gear wheels 18, 19 drive the output shaft 20 by way of the planet carrier 32. In this operating state, the clutch 13, which is likewise accommodated in the power split transmission 1, is disengaged, so that no mechanical power flow can take place via the shaft 8 or the drive shaft 25, for example a universal shaft, to the gear wheel 22, which is likewise present in the power split transmission 1. This first driving range, having low speeds and a greater need for traction force and/or torque, utilizes the capability of the hydrostatic units 9, 16 to generate high torque, and their ability to generate high forces, even at speeds in the range of n=0 rpm. Good capacity for control of the hydrostatic units 9, 16 allows the drive engine 3 to be operated in a speed- and performance-optimized manner.

For this reason, the known efficiency drawbacks of hydrostatics as compared to mechanics in terms of an overall analysis become less important for low speeds within this first speed range. When the sun gear 42 or the gear wheel 22 has reached a sufficiently high speed, in this first driving range, the mechanical power branch, i.e., internal combustion engine 3, is connected to the gear wheels 21, 22 by way of the clutch 13, and the hydrostatic power branch 9, 16 is disconnected by deactivation of the clutch 43. In this operating state, the power split transmission 1 is thus operated purely mechanically in the first driving range. So as to increase efficiency, the hydraulic motor 16 is switched off and stopped by way of the clutch 43 as a function of the required power or the required torque, so as to prevent drag torque.

As the vehicle speed increases and the resulting need for traction force or torque decreases, there is a continuous decline in the need for the hydrostatic units 9, 16 to be able to generate high torque, so that the hydrostatic units 9, 16 can be down regulated, depending on the current speed, and decoupled. To this end, a hydrostatic mechanical torque division phase is initially set in the average speed range, and in the high speed range, a transition is made to exclusively mechanical operation, so as to optimize efficiencies.

In the average speed range, torque division is adjusted for optimal speed and/or power adjustment of the drive engine 3 by releasing the brake 34 and a further clutch 43 and engaging the clutch 13 and the clutch 29. In this operating state, the power of the drive engine 3 is transmitted to the sun gear 42 of the planetary gear system 31 by way of the mechanical branch comprising the drive shaft 4, the gear wheel elements 5 and 24, the shaft 8 and drive shaft 25, and the clutch 13 and gear wheel 22, while the drive engine 3 power is further hydrostatically converted by way of the hydraulic pump 9 and conducted to the hydraulic motor 16, wherein the hydraulic motor 16 then drives the ring gear 11 by way of the shaft 41, the clutch 29, the gear wheel 44 and the gear wheel 23. The power of the mechanical branch and the hydrostatic power are added in the planetary gear system 31 and transmitted to the planet carrier 32. The rotational speeds of the ring gear 11 and of the sun gear 42 are added in the manner of a superimposed transmission, and the sum of the two speeds produces the planetary gear system output speed at the planet carrier 32, which dictates the rotational speed of the output shaft 20, or the vehicle velocity resulting therefrom, in a directly proportional manner. The rotational speed of the ring gear 11 is adjusted by way of the easy-to-regulate hydraulic motor 16 so that, with a view to the required vehicle velocity, the rotational speed of the sun gear 42, and thus the directly proportional speed of the drive engine 3 in CVT (continuously variable transmission) mode, are adjusted in an efficiency- and/or power-optimal manner.

In the last, high speed range, driving takes place exclusively mechanically by controlling the power of the hydrostatic units 9, 16 toward P=0 kW and producing a state of entirely constrained motion in the planetary gear system 31 by way of the clutches 29 and 43. In this operation scenario, the hydraulic pump 9 is not used for driving and optionally is decoupled by way of a clutch, which is not shown, so as to prevent drag torque.

FIG. 2 shows a different configuration of the drive elements, wherein the driving ranges occur in a manner similar to that described in FIG. 1. However, so as to implement reverse driving using the mechanical path, a reversing stage gear train comprising a gear wheel 35, a clutch 36 and gear wheels 45, 37 is further provided in the area of the drive shaft 25, so as to selectively change the direction of rotation of the drive shaft. FIG. 4 similarly shows a different configuration of the drive elements relative to the embodiment of FIG. 3.

The invention claimed is:

1. A hydrostatic mechanical power split transmission, comprising:
   a drive engine;
   a housing;
   a first power branch comprised of a hydraulic pump, a hydraulic motor, a first drive shaft, and a first plurality of clutches;
   a planetary gear system comprising a sun gear and a ring gear; and
   a second power branch driven either one of directly or indirectly by the drive engine and comprising a second drive shaft, a second clutch, and a plurality of gear wheels;
   wherein the first drive shaft is selectively coupled or decoupled, either directly or indirectly, to either one of said sun gear or said ring gear by at least one of said first plurality of clutches;
   wherein the planetary gear system has a gear ratio in relation to the first drive shaft for optimizing performance of the first power branch;
   wherein the plurality of gear wheels of the second power branch provides a gear ratio for optimizing performance of the second power branch;
   wherein the second clutch couples the second drive shaft to the sun gear of the planetary gear system; and
   wherein the planetary gear system is switchable to a state of constrained motion by concurrent engagement with each one of said plurality of first clutches of said first power branch so as to reduce mechanical friction and oil churning losses.

2. The power split transmission according to claim 1 wherein the second drive shaft is as a universal shaft.

3. A power split transmission according to claim 1, wherein the hydraulic motor is selectively couplable to at least one of the sun gear and the ring gear.

4. A power split transmission according to claim 1, wherein the hydraulic motor is decouplable from the planetary gear system.

5. A power split transmission according to claim 4, wherein the hydraulic motor, when decoupled from the planetary gear system, can be brought to a halt by the hydraulic pump being regulated to a pump flow rate Q of Q=0 l/min.

6. A power split transmission according to claim 1, wherein the hydraulic motor is disposed inside the housing.

7. A power split transmission according to claim 1, wherein the housing has an oil sump and moving drive elements of the hydraulic motor are disposed outside the housed oil sump so as to prevent churning losses.

8. A power split transmission according to claim 1, wherein the second power branch is connectable to the sun gear by way of the second clutch in at least one of a power-adaptive, rotational speed-adaptive, and acceleration-adaptive manner.

9. A power split transmission according to claim 1, wherein the hydraulic motor is connectable to the sun gear by way of one of the plurality of first clutches in at least one of a power-adaptive, rotational speed-adaptive, and acceleration-adaptive manner.

10. A power split transmission according to claim 1, wherein the hydraulic motor is connectable to the ring gear by way of one of the plurality of first clutches in at least one of a power-adaptive, rotational speed-adaptive, and acceleration-adaptive manner.

11. A power split transmission according to claim 1, further comprising proximate the first drive shaft, a reversing stage gear train including a reverse stage gear train clutch, in which a direction of rotation of the sun gear is reversed by way of the reverse stage gear train clutch.

12. A power split transmission according to claim 1, wherein the hydraulic motor is a variable displacement motor and the hydraulic pump is a variable displacement pump.

13. A power split transmission according to claim 1, wherein the hydraulic pump is directly or indirectly drivable by the second power branch.

14. A power split transmission according to claim 1, further comprising a brake and wherein the ring gear can be fixed by way of the brake.

15. A power split transmission according to claim 1, further comprising an output shaft and wherein the planetary gear system includes a planet carrier directly or indirectly connected to the output shaft.

16. A power split transmission according to claim 1, wherein the drive engine is an internal combustion engine.

17. A power split transmission according to claim 16, wherein the second power branch is connectable to the sun gear so that operation of the drive engine is optimized in terms of fuel consumption.

18. A hydrostatic mechanical power split transmission, comprising:
   a housing;
   a first clutch, a second clutch, and a third clutch;
   a first input drive shaft and a second input drive shaft;
   a planetary gear system, situated within the housing, including a sun wheel and a ring gear, the sun wheel being directly coupled to a first gear wheel and indirectly coupled to a second gear wheel to define a gear ratio, the planetary gear system being selectively capable of receiving hydraulic drive power from the second input drive shaft while the second clutch is engaged, wherein said hydraulic drive power also is capable of being received while the third clutch is engaged so as to allow a fourth gear wheel to interact with the ring gear, the planetary gear system having a constrained motion when the second clutch and third clutch are engaged at a same time;
   a second power branch drivable by a first drive engine to transfer power to the planetary gear system when the first clutch is engaged thereby allowing power flow from the first input drive shaft over the second gear wheel to the first gear wheel and the planetary gear system;

a first power branch, driven by a hydraulic motor to transfer power to the planetary gear system when either one or both of the second clutch and the third clutch are engaged;

a brake that is selectively switched between a first brake state in which the ring gear is clamped against the housing and a second brake state in which the ring gear is released from the housing;

an output device having a connection to the planetary gear system consisting of a first connection gear wheel, a second connection gear wheel, and an output drive shaft;

wherein during a first operating state, for maximizing torque at the output shaft, the first input drive shaft is disengaged from the second gear wheel so as to avoid mechanical power flow from the first drive engine to the planetary gear system by the second power branch, the hydraulic motor drives the sun wheel through the second clutch, which is engaged, and through the first gear wheel, and said third clutch is disengaged and the brake is in said first brake state;

wherein during a second operating state, for a first power split operation for driving the output shaft, the first input drive shaft is engaged with the second gear wheel so that mechanical power flow from the first drive engine to the planetary gear system is by the second power branch, the hydraulic motor drives the sun wheel by the first power branch through the engaged, second clutch and first gear wheel, the third clutch is disengaged, and the brake is in the first brake state;

wherein during a third operating state, for a second power split operation mode in which drive speed of the output shaft is improved, the first input drive shaft is engaged to the second gear wheel so that mechanical power flows from the first drive engine to the planetary gear system by the first power branch, the hydraulic motor drives the ring gear by the first power branch through the engaged, third clutch and fourth gear wheel, the second clutch is disengaged and the brake is in the second brake state; and wherein during a fourth operating state the first input drive shaft is engaged to the second gear wheel so that mechanical power flows from the drive engine to the planetary gear system by the second power branch, said second clutch and said third clutch are engaged thereby constraining motion of the planetary gear system while the first power branch is controlled so as to not provide power to the planetary gear system, and the brake is in the second brake state.

19. A hydrostatic mechanical power split transmission, comprising:

a housing;

a planetary gear system situated within the housing and coupled to a first gear wheel for coupling mechanical drive power to an output shaft, the planetary gear system having a plurality of drivable shafts and a having a plurality of gears, the planetary gear system having a constrained motion when one of the plurality of drivable shafts drives another of the drivable shafts;

a second power branch drivable by a first drive engine and coupled to the planetary gear system by a second gear wheel when a first clutch is engaged, the second power branch comprising an input shaft, a first drive shaft, the first clutch and the second gear wheel, the input shaft being configured to be coupled to the first drive engine, the planetary gear system being switched to a state of constrained motion when the first clutch is disengaged;

a first power branch, driven by a hydraulic motor, and coupled to the planetary gear system when a second clutch is engaged, the first power branch comprising a second drive shaft, the second clutch and a third gear wheel, wherein during a first operating state the first drive shaft driven by the first drive engine is disengaged from the second gear wheel so as to avoid mechanical power flow from the first drive engine to the planetary gear system by the second power branch, during said first operating state the hydraulic motor drives the planetary gear system to generate first mechanical drive power to said output shaft, the planetary gear system having said constrained motion during said first operating state;

wherein during a second operating state the first drive shaft driven by the first drive engine is coupled to the second gear wheel by the first clutch with said second gear wheel coupled to the planetary gear system to drive the planetary gear system so as to generate second mechanical drive power to said output shaft, during said second operating state the hydraulic motor is disengaged from driving the planetary gear system, the planetary gear system having said constrained motion during said second operating state; and wherein during a third operating state the first drive shaft driven by the first drive engine is coupled to the second gear wheel by the first clutch with said second gear wheel coupled to the planetary gear system to drive the planetary gear system so as to generate said second mechanical drive power to said output shaft, and the hydraulic motor further drives the planetary gear system to generate said first mechanical drive power to said output shaft, the planetary gear system not exhibiting said constrained motion during said third operating state.

* * * * *